US012241416B2

(12) United States Patent
Kisun

(10) Patent No.: US 12,241,416 B2
(45) Date of Patent: Mar. 4, 2025

(54) ADAPTOR FOR A FUEL SYSTEM OF AN AIRCRAFT ENGINE

(71) Applicant: PRATT & WHITNEY CANADA CORP., Longueuil (CA)

(72) Inventor: Gavin Rohiteshwar Kisun, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/810,624

(22) Filed: Jul. 4, 2022

(65) Prior Publication Data

US 2024/0003298 A1    Jan. 4, 2024

(51) Int. Cl.
  *F02C 7/22*    (2006.01)
  *F02C 7/232*    (2006.01)

(52) U.S. Cl.
  CPC .............. *F02C 7/222* (2013.01); *F02C 7/232* (2013.01); *F05D 2220/323* (2013.01); *F05D 2260/60* (2013.01)

(58) Field of Classification Search
  CPC ................................. F02C 7/222; F02C 7/232
  See application file for complete search history.

(56) References Cited

U.S. PATENT DOCUMENTS

| | | | |
|---|---|---|---|
| 4,467,610 A | 8/1984 | Pearson et al. | |
| 5,031,407 A | 7/1991 | Zaremba et al. | |
| 5,273,249 A | 12/1993 | Peterson et al. | |
| 9,874,351 B2 | 1/2018 | Wolfe | |
| 11,719,159 B2 | 8/2023 | Kisun | |
| 11,867,125 B2 | 1/2024 | Kisun et al. | |
| 11,939,922 B2 | 3/2024 | Francis et al. | |
| 2006/0272330 A1* | 12/2006 | Lewis | F02C 7/22 60/739 |
| 2013/0125556 A1* | 5/2013 | Hoke | F02C 7/228 60/739 |
| 2015/0176496 A1 | 6/2015 | Zordan et al. | |
| 2015/0198096 A1* | 7/2015 | Morenko | F02C 7/222 60/739 |
| 2016/0201562 A1* | 7/2016 | Chasse, Jr. | F02C 7/222 60/739 |
| 2018/0087776 A1 | 3/2018 | Flanagan et al. | |

(Continued)

FOREIGN PATENT DOCUMENTS

RU    2815321    3/2024

OTHER PUBLICATIONS

European Search Report issued on Nov. 6, 2023 for corresponding application No. 23183136.3.

*Primary Examiner* — Ted Kim
(74) *Attorney, Agent, or Firm* — NORTON ROSE FULBRIGHT CANADA LLP

(57) ABSTRACT

A fuel system of an aircraft engine, has: a fuel manifold having a first manifold inlet and a second manifold inlet; a transfer tube assembly having a first tube slidably engaged to the fuel manifold and fluidly connected to the first manifold inlet, and a second tube slidably engaged to the fuel manifold and fluidly connected to the second manifold inlet; and an adaptor having: a body slidably engaged by the first tube and by the second tube, a first member defining a first fuel conduit fluidly connected to the first manifold inlet via the first tube, and a second member defining a second fuel conduit fluidly connected to the second manifold inlet via the second tube.

16 Claims, 5 Drawing Sheets

(56) References Cited

U.S. PATENT DOCUMENTS

| | | |
|---|---|---|
| 2019/0107285 A1* | 4/2019 | Morenko .................. F23R 3/34 |
| 2020/0103116 A1* | 4/2020 | Morenko ................ F02C 7/222 |
| 2020/0191092 A1 | 6/2020 | Elliott |
| 2023/0003171 A1* | 1/2023 | Kisun ..................... F02C 7/222 |
| 2023/0018918 A1* | 1/2023 | Dillon ..................... F02C 7/222 |
| 2024/0011439 A1 | 1/2024 | Kisun et al. |

\* cited by examiner

ADAPTOR FOR A FUEL SYSTEM OF AN AIRCRAFT ENGINE

TECHNICAL FIELD

The present disclosure relates generally to aircraft engines such as gas turbine engines and, more particularly, to fuel systems of such engines.

BACKGROUND

Gas turbine engines include a fuel system for delivering fuel from a fuel source to fuel nozzles for combustion. A manifold may be used to distribute the fuel between the nozzles. In some configurations, thermal fights (e.g. thermal differentials) may be present between different components of the fuel system. Improvements are therefore sought.

SUMMARY

In one aspect, there is provided a fuel system of an aircraft engine, comprising: a fuel manifold having a first manifold inlet and a second manifold inlet; a transfer tube assembly having a first tube slidably engaged to the fuel manifold and fluidly connected to the first manifold inlet, and a second tube slidably engaged to the fuel manifold and fluidly connected to the second manifold inlet; and an adaptor having: a body slidably engaged by the first tube and by the second tube, a first member defining a first fuel conduit fluidly connected to the first manifold inlet via the first tube, and a second member defining a second fuel conduit fluidly connected to the second manifold inlet via the second tube.

The fuel system defined above and described herein may include one or more of the following features, in whole or in part, and in any combinations.

In some embodiments, the first member is monolithically connected to the body.

In some embodiments, the second member is a tube secured to the body.

In some embodiments, the first member extends from the body to a first end, the first end defining a first flange securable to a flow divider valve.

In some embodiments, the second member extends from the body to a second end, the second end defining a second flange securable to the flow divider valve.

In some embodiments, the first member and the second member extend from the body and end respectively at a first end and a second end, the first end spaced apart and distinct form the second end.

In some embodiments, a flow divider valve has an inlet, a primary outlet hydraulically connected to the first fuel conduit, and a secondary outlet hydraulically connected to the second fuel conduit.

In some embodiments, the first member is a bracket secured to the flow divider valve, the transfer tube assembly supported by the bracket secured to the flow divider valve.

In another aspect, there is provided an aircraft engine, comprising a fuel system having: a fuel manifold having a first manifold inlet and a second manifold inlet; a transfer tube assembly having a first tube slidably engaged to the fuel manifold and fluidly connected to the first manifold inlet, and a second tube slidably engaged to the fuel manifold and fluidly connected to the second manifold inlet; and an adaptor having: a body slidably engaged by the first tube and by the second tube, a first member defining a first fuel conduit fluidly connected to the first manifold inlet via the first tube, and a second member defining a second fuel conduit fluidly connected to the second manifold inlet via the second tube.

The aircraft engine defined above and described herein may include one or more of the following features, in whole or in part, and in any combinations.

In some embodiments, the first member is monolithically connected to the body.

In some embodiments, the second member is a tube secured to the body.

In some embodiments, the first member extends from the body to a first end, the first end defining a first flange securable to a flow divider valve.

In some embodiments, the second member extends from the body to a second end, the second end defining a second flange securable to the flow divider valve.

In some embodiments, the first member and the second member extend from the body and end respectively at a first end and a second end, the first end spaced apart and distinct form the second end.

In some embodiments, a flow divider valve has an inlet, a primary outlet hydraulically connected to the first fuel conduit, and a secondary outlet hydraulically connected to the second fuel conduit.

In some embodiments, the first member is a bracket secured to the flow divider valve, the transfer tube assembly supported by the bracket secured to the flow divider valve.

In yet another aspect, there is provided an adaptor for a fuel system of an aircraft engine, comprising: a body defining a first connection port and a second connection port, a first member defining a first fuel conduit in fluid communication with the first connection port, and a second member defining a second fuel conduit in fluid communication with the second connection port.

The adaptor defined above and described herein may include one or more of the following features, in whole or in part, and in any combinations.

In some embodiments, the first member is monolithically connected to the body, the second member being a tube secured to the body.

In some embodiments, the first member extends from the body to a first end, the first end defining a first flange securable to a flow divider valve.

In some embodiments, the second member extends from the body to a second end, the second end defining a second flange securable to a flow divider valve.

BRIEF DESCRIPTION OF THE DRAWINGS

Reference is now made to the accompanying figures in which.

DETAILED DESCRIPTION

Figure 1:
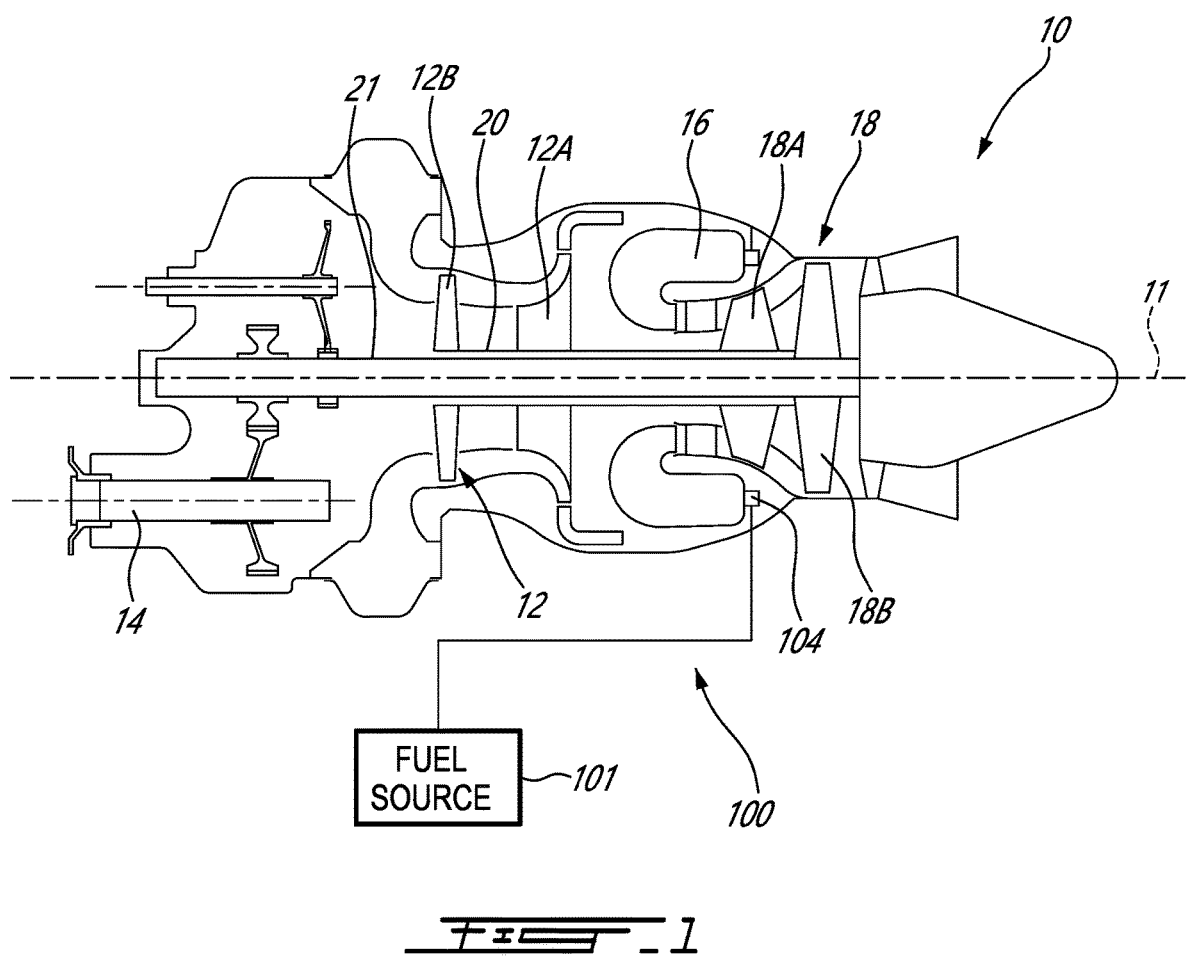
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight. According to the illustrated example, the gas turbine engine 10 is a turboshaft engine generally comprising in serial flow communication a compressor section 12 for pressurizing the air, a combustor 16 in which the compressed air is mixed with fuel and ignited for generating an annular stream of hot combustion gases, and a turbine section 18 for extracting energy from the combustion gases. The compressor section 12 and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 12A of the compressor section 12, and a low-pressure spool having a low-pressure shaft 21 drivingly engaging a low-pressure turbine 18B of the turbine section 18 to a low-pressure compressor 12B of the compressor section 12 and drivingly engaged to an output shaft 14. The output shaft 14 may drivingly engage a rotor or any rotatable load. It will be understood that the contents of the present disclosure may be applicable to any suitable engines, such as turbofans, turboprops, turboshafts, and reciprocating engines, such as piston and rotary engines without departing from the scope of the present disclosure.

Figure 2:
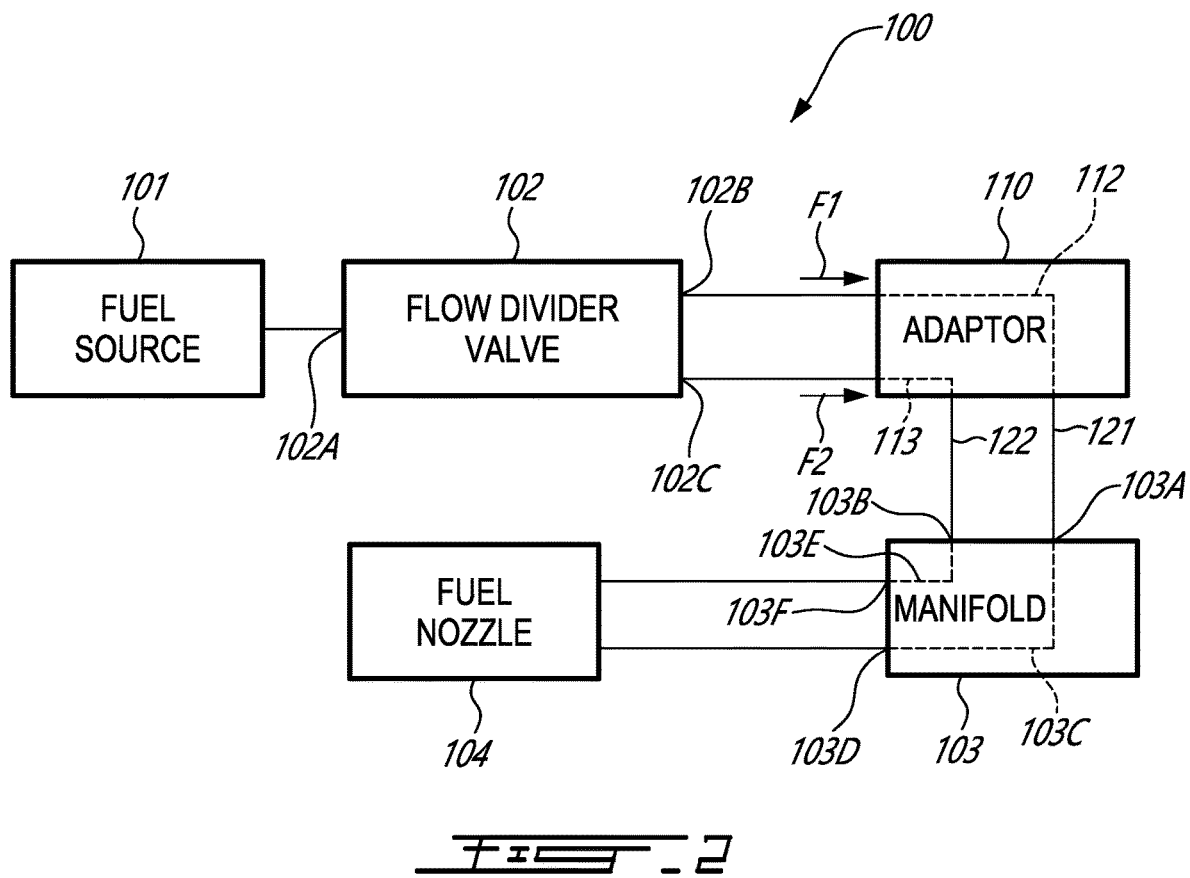
FIG. 2 is a schematic view of a fuel system for the aircraft engine of FIG. 1.

Referring now to FIG. 2, the gas turbine engine includes a fuel system 100 including a fuel source 101 (e.g., reservoir) hydraulically connected a flow divider valve 102. The flow divider valve 102 divides a fuel flow flowing from the fuel source 101 into a primary fuel flow F1 and a secondary fuel flow F2. The flow divider valve 102 includes an inlet 102A receiving fuel from the fuel source 101, a first outlet 102B outputting the primary fuel flow F1, and a second outlet 102C outputting the secondary fuel flow F2. The flow divider valve 102 may include a valve body movable within a valve housing to divide the fuel flow between the primary fuel flow F1 and the secondary fuel flow F2 at a specified ratio. Although not illustrated, it is understood that the fuel system 100 includes a fuel pump to drive the primary and secondary fuel flows F1, F2.

The fuel system 100 includes a manifold 103 that distributes the fuel between fuel nozzles 104. The manifold 103 may be a segmented ring extending circumferentially around the central axis 11. The manifold 103 defines a first manifold inlet 103A hydraulically connected to the first outlet 102B of the flow divider valve 102 and a second manifold inlet 103B hydraulically connected to the second outlet 102C of the flow divider valve 102. The manifold 103 includes a primary fuel conduit 103C fluidly connected to the first manifold inlet 103A and leading to first manifold outlets 103D circumferentially distributed about the central axis 11, and includes a secondary fuel conduit 103E fluidly connected to the second manifold inlet 103B and leading to second manifold outlets 103F circumferentially distributed about the central axis 11.

Figure 3:
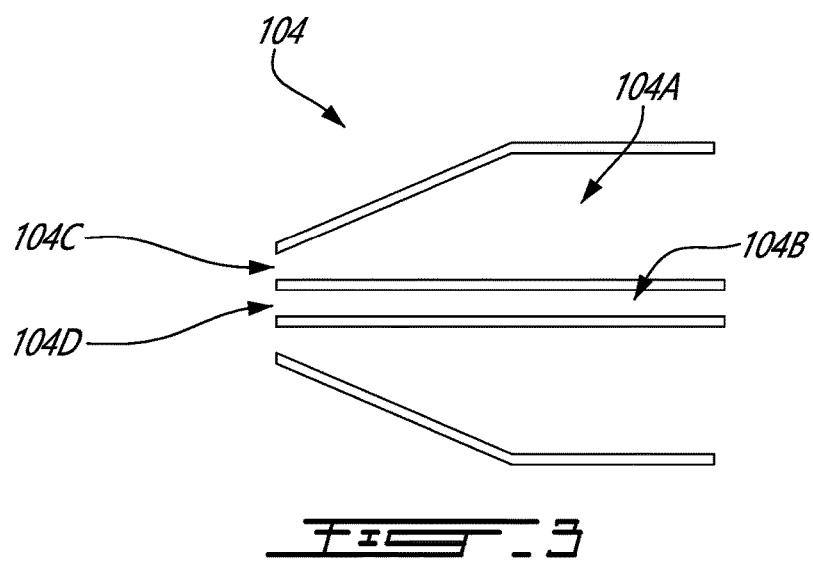
FIG. 3 is a schematic cross-sectional view of a portion of a fuel nozzle of the aircraft engine of FIG. 1.

As shown in FIGS. 2-3, the fuel nozzles 104 each includes a primary fuel passage 104A in fluid flow communication with a respective one of the first manifold outlets 103D and a secondary fuel passage 104B in fluid flow communication with a respective one of the second manifold outlets 103F. The fuel nozzle 104 defines a first nozzle outlet 104C in fluid communication with the primary fuel passage 104A and a second nozzle outlet 104D in fluid flow communication with the secondary fuel passage 104B. These two fuel passages 104A, 104B may be concentric.

Engine configurations used for multiple applications, such as turboshaft and turboprop, may reduce costs through economies of scale via the use of common hardware. Unique hardware is typically used when needed, to optimize weight and cost to meet the different application requirements. In some cases, common hardware has to interface with unique hardware. This may impose design constraints. For instance, the fuel nozzles 104 may be a common hardware it that they may be used for more than one applications. However, the flow divider valve 102, which provides fuel for the manifold 103 is usually unique due to the different operability requirements. Rigid tubing and/or transfer tubes may be used to connect the fuel nozzles 104 to the flow divider valve 102. However, rigid tubing still physically couples the two mounting points together, which may result in a thermal mismatch during operation and may allow modes from one component to be transferred to the other. Transfer tubes decouple any thermal and dynamic modes from one component to the other, but they may not directly interface between common and unique hardware due to the inherent linear design constrain since they may have to be aligned parallel to the central axis 11 of the gas turbine engine 10.

Therefore, in the embodiment shown, an adaptor 110 is provided. The adaptor 110 is used to interconnect the flow divider valve 102 to the manifold 103. The adaptor 110 is described below in more detail with reference to FIGS. 4-5.

Figure 4:
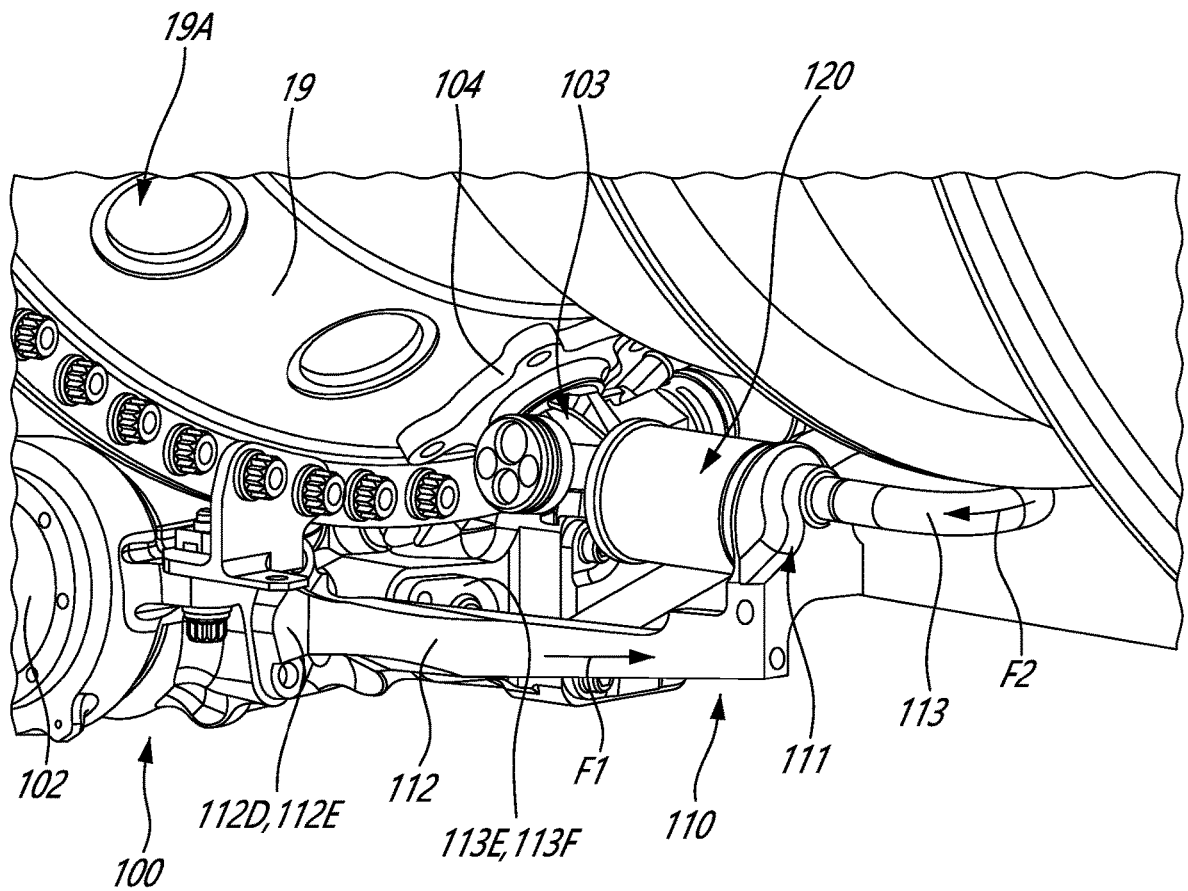
FIG. 4 is a three dimensional view illustrating components of the fuel system of FIG. 2 and an adaptor in accordance with one embodiment.
Figure 5:
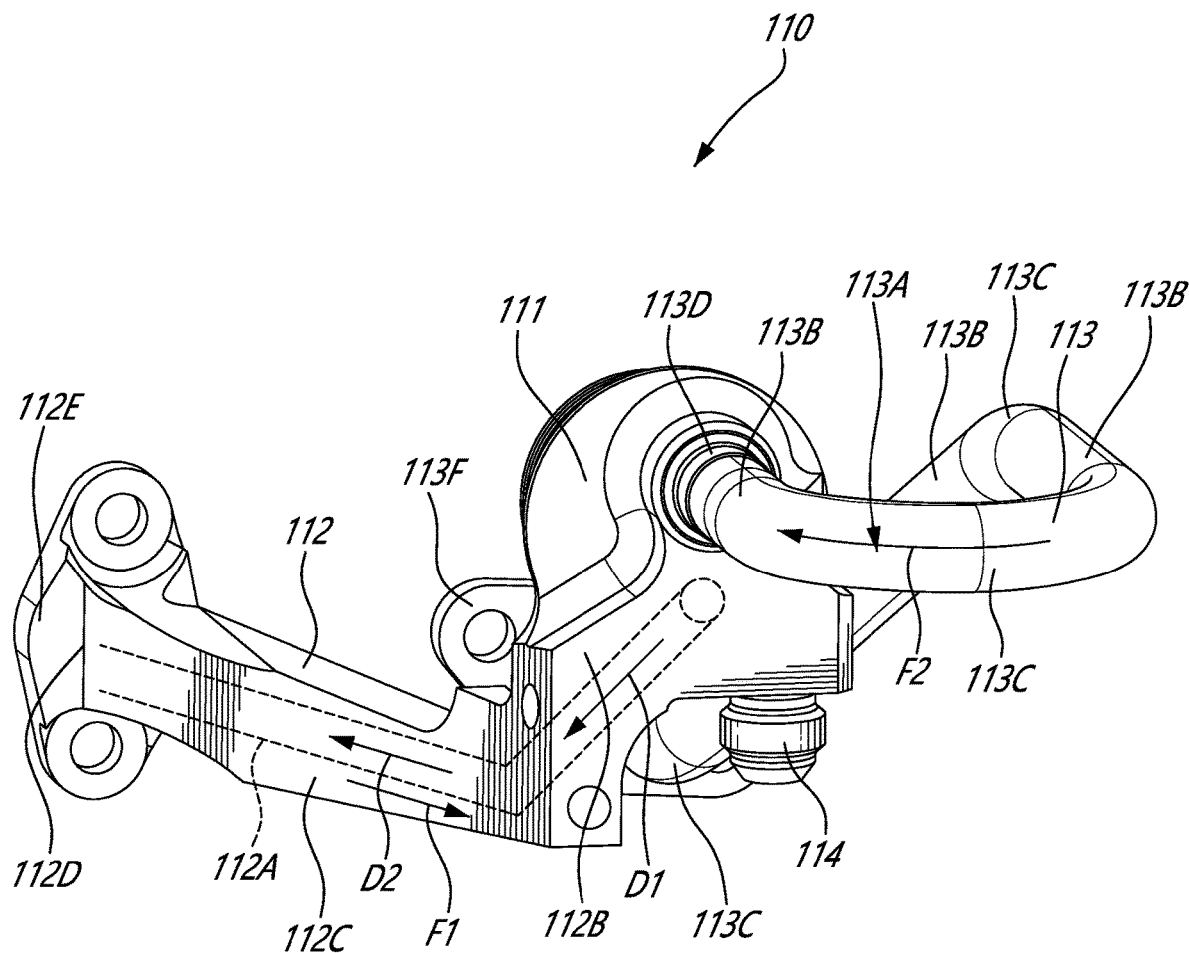
FIG. 5 is a three dimensional view of the adaptor of FIG. 4.

Referring now to FIGS. 4-5, in the embodiment shown, the fuel nozzles 104 are secured to a casing 19 of the gas turbine engine 10. The casing 19 defines a plurality of apertures 19A circumferentially distributed about the central axis 11. Each of the apertures 19A is sized to accept a respective one of the fuel nozzles 104. As illustrated, the first outlet 102B and the second outlet 102C of the flow divider valve 102 face a direction having an axial component relative to the central axis 11. The direction faced by the first and second outlets 102B, 102C of the flow divider valve 102 may be substantially axial. Similarly, the first manifold inlet 103A and the second manifold inlet 103B face the direction being substantially axial relative to the central axis 11. It may therefore be impractical to use transfer tubes to interconnect the manifold 103 to the flow divider valve 102 since, as mentioned above, the transfer tubes may require to be aligned parallel to the central axis 11.

The adaptor 110 may allow the use of a transfer tube assembly 120 to interconnect the manifold 103 to the flow divider valve 102 while dynamically disconnecting these two components. This may avoid the transfer of thermal-induced stress or dynamic stress between these two components. In the embodiment shown, the transfer tube assembly 120 is disposed between the manifold 103 and the adaptor 110. More detail about this transfer tube assembly 120 are presented below with reference to FIG. 6.

The adaptor 110 includes a body 111 slidably engageable by the transfer tube assembly 120, a first member 112 defining a first fuel conduit 112A fluidly connected to the first manifold inlet 103A, and a second member 113 defining a second fuel conduit 113A fluidly connected to the second manifold inlet 103B. The first fuel conduit 112A of the first member 112 fluidly connects the first outlet 102B of the flow divider valve 102 to the first manifold inlet 103A. The second fuel conduit 113A of the second member 113 fluidly connects the second outlet 102C of the flow divider valve 102 to the second manifold inlet 103B.

In the present embodiment, the first member 112 is monolithically connected to the body 111. Stated differently, the body 111 and the first member 112 may be part of a single monolithic body. The second member 113 may be a tube, which may be substantially rigid, secured to the body 111. The tube may be made of any suitable material, such as copper, steel, and so on. The tube may be welded or brazed to the body 111. In some other embodiments, the second member 113 may be monolithically connected to the body 111.

In the embodiment shown, the first member 112 is a bracket that is secured to the flow divider valve 102. Therefore, the transfer tube assembly 120 is supported by the bracket. In other words, the transfer tube assembly 120 is supported by the flow divider valve 102 via the bracket. The first member 112 therefore has a dual function: first, it provides fluid communication between the manifold 103 and the flow divider valve 102; second, it structurally supports the body 111 and the transfer tube assembly 120.

As shown in FIG. 5, the first member 112 has a first section 112B extending from the body 111 along a first direction D1 having a circumferential component and, in the present case, a radial component relative to the central axis 11, and a second section 112C extending from the first section 112B along a second direction D2 having an axial component relative to the central axis 11. The first section 112B is generally transverse to the second section 112C. The second section 112C terminates at a first end 112D. A first flange 112E is defined at the first end 112D. The first flange 112E may be monolithic with the first member 112. The first member 112 is secured to flow divider valve 102 via the first flange 112E. Understandably, the first member 112 is secured to the flow divider valve 102 at a location where the first outlet 102B of the flow divider valve 102 registers with the first fuel conduit 112A of the first member 112 of the adaptor 110.

The second member 113 defines a plurality of straight sections 113B interconnected with bends or elbows 113C such that the second member 113 extends from a first tube end 113D at the body 111 to a second tube end 113E (FIG. 4) connected to a second flange 113F. The first tube end 113D is axially offset from the second tube end 113E. In the present embodiment, the first tube end 113D is also radially and circumferentially offset from the second tube end 113E. Other configurations are contemplated. The second flange 113F may be welded or brazed to the second tube end 113E. The second member 113 is secured to the flow divider valve 102 via the second flange 113F. Understandably, the second member 113 is secured to the flow divider valve 102 at a location where the second outlet 102C of the flow divider valve 102 registers with the second fuel conduit 113A of the second member 113 of the adaptor 110. As shown in FIG. 4, the first end 112D of the first member 112 and the second tube end 113E of the second member 113 are spaced apart and distinct from one another.

Figure 6:
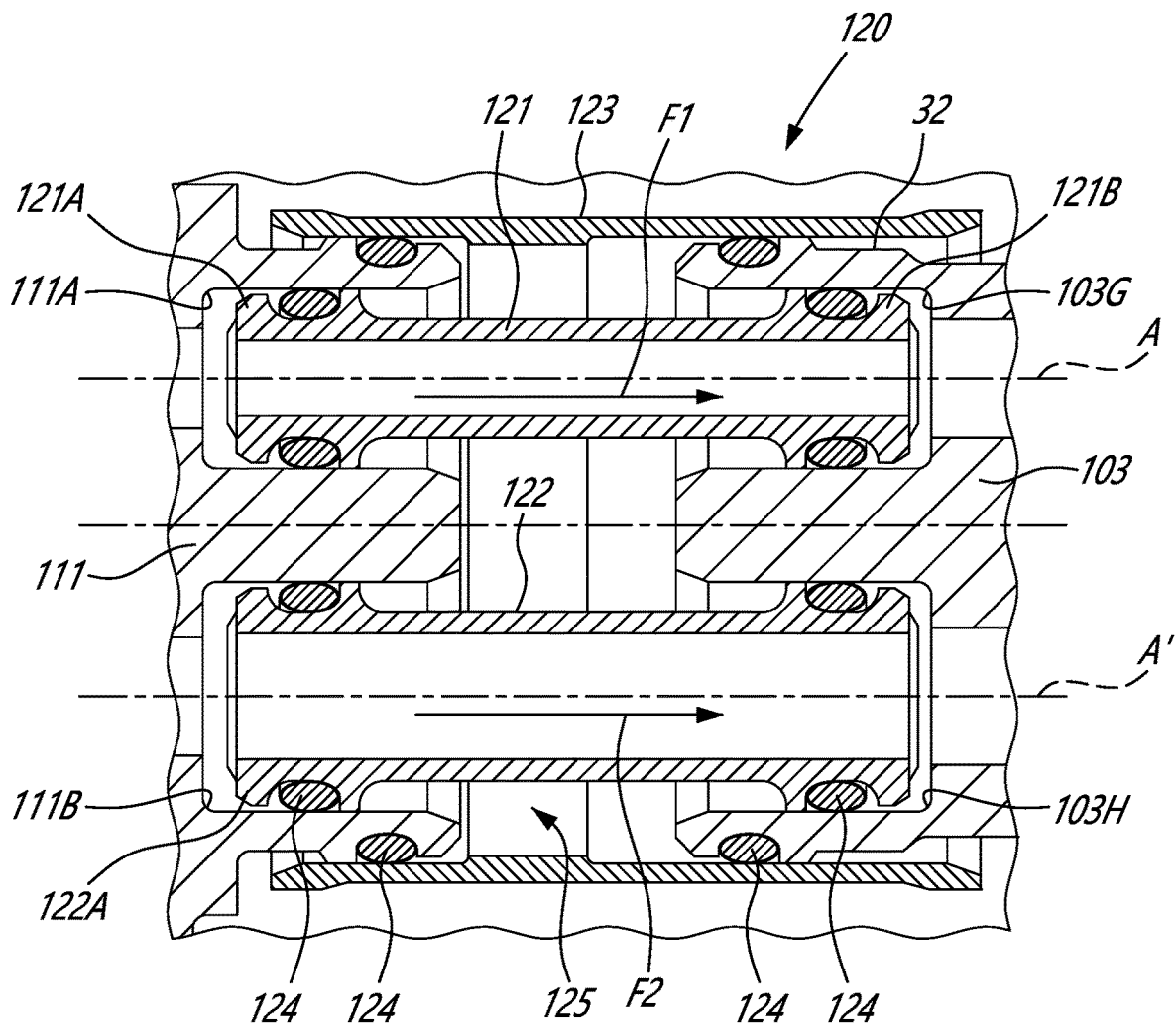
FIG. 6 is a cross-sectional view of a transfer tube assembly in accordance with one embodiment.

Reference now to FIG. 6, the transfer tube assembly is described in more details. The transfer tube assembly 120 includes a first transfer tube 121 having a rigid, tubular body extending along a longitudinal axis A from a first tube end 121A to a second tube end 121B. The first tube end 121A is slidably received within a first connection port 111A of the body 111, whereas the second tube end 121B extends to outside the first connection port 111A so as to be slidably receivable by a first manifold port 103G of the manifold 103. The first manifold port 103G is connected to the first manifold inlet 103A. Around either ends 121A, 121B of the first transfer tube 121, O-rings 124 may be mounted for sealing engagement with the corresponding ports, thereby sealing a passage from one port to the other via the first transfer tube 121. A second transfer tube 122 of the transfer tube assembly 120 has a rigid, tubular body extending along a longitudinal axis A' from a first tube end 122A to a second tube end 122B. The first tube end 122A is slidably received by a second connection port 111B of the body 111, whereas the second tube end 122B extends to outside the second connection port 111B so as to be slidably receivable by a second manifold port 103H of the manifold 103. The second manifold port 103H is connected to the second manifold inlet 103B. Around either ends 122A, 122B of the second transfer tube 122, O-rings 124 may be mounted for sealing engagement with the corresponding ports, thereby sealing a passage from one port to the other via the second transfer tube 122.

According to some embodiments, the transfer tube assembly 120 includes a drain sleeve 123 extending around the first transfer tube 121 and the second transfer tube 122. As shown in FIG. 6, O-rings 124 may be mounted around the body 111 and around the manifold 103 for sealing engagement with an inner cylindrical surface of the drain sleeve 123, thereby defining extremities of a sealed cavity 125 inside the drain sleeve 123. However, the drain sleeve 123 may be omitted depending on the implementation. In the embodiment shown, a sealed cavity 125 is fluidly connected to a drain nipple 114 (FIG. 5). The drain nipple 114 may be a monolithic part of the body 111. The drain nipple 114 may extend downwardly and may be fluidly connected to a hose or any suitable conduits for scavenging fuel that leaked from the transfer tube assembly 120. This hose may be connected to the fuel source 101 so that leaked fuel may be flown away from the fuel nozzles 104. This fuel may then be flown either overboard or back to the fuel source.

The adaptor 110 may be manufactured through any method of manufacturing such as additive manufacturing, metal injection molding, conventional. It may allow the unique hardware's interfaces (e.g., flow divider valve 102) to be adapted and accept the interface used by the common hardware (e.g., fuel nozzles 104). The adaptor 110 and transfer tube assembly 120 may accommodate assembly deflections between the ports and may ensure the fuel nozzles 104 are decoupled from any modes or thermal loads from the flow divider valve 102.

This disclosed configuration may offer advantages such as a lower number individual components to dynamically and thermally decouple the interface between the fuel nozzles 104 and the flow divider valve 102 while allowing fluid communication between the two and accommodating assembly deflections between the different ports of the flow divider valve 102. This may result in a configuration having a reduced weight compared to conventional configuration. This configuration may also reduce manufacturing and assembly costs.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A fuel system of an aircraft engine, comprising:
   a fuel manifold extending around a central axis, the fuel manifold having a first manifold inlet and a second manifold inlet;
   fuel nozzles fluidly connected to the fuel manifold and circumferentially distributed around the central axis, the fuel nozzles located downstream of the first manifold inlet and of the second manifold inlet relative to a flow of fuel from a fuel source to the fuel nozzles;

a flow divider valve upstream of the first manifold inlet and of the second manifold inlet of the fuel manifold and upstream of all of the fuel nozzles being fluidly connected to the fuel manifold;

a transfer tube assembly downstream of the flow divider valve and upstream of the first manifold inlet and of the second manifold inlet, the transfer tube assembly located upstream of all of the fuel nozzles being fluidly connected to the fuel manifold, the transfer tube assembly having a first tube slidably engaged to the fuel manifold and fluidly connected to the first manifold inlet, and a second tube slidably engaged to the fuel manifold and fluidly connected to the second manifold inlet; and an adaptor located downstream of the flow divider valve and upstream of both of the transfer tube assembly and the fuel manifold, the adaptor having:
- a body slidably engaged by the first tube and by the second tube,
- a first member defining a first fuel conduit fluidly connected to the first manifold inlet via the first tube, and
- a second member defining a second fuel conduit fluidly connected to the second manifold inlet via the second tube.

2. The fuel system of claim 1, wherein the first member is monolithically connected to the body.

3. The fuel system of claim 1, wherein the second member is a tube secured to the body.

4. The fuel system of claim 1, wherein the first member extends from the body to a first end, the first end defining a first flange securable to the flow divider valve.

5. The fuel system of claim 4, wherein the second member extends from the body to a second end, the second end defining a second flange securable to the flow divider valve.

6. The fuel system of claim 1, wherein the first member extends from the body to a first end and the second member extends from the body to a second end, the first end spaced apart and distinct form the second end.

7. The fuel system of claim 1, wherein the flow divider valve has an inlet, a primary outlet hydraulically connected to the first fuel conduit, and a secondary outlet hydraulically connected to the second fuel conduit.

8. The fuel system of claim 7, wherein the first member is a bracket secured to the flow divider valve, the transfer tube assembly supported by the bracket secured to the flow divider valve.

9. An aircraft engine, comprising a fuel system having:
a fuel manifold extending around a central axis, the fuel manifold having a first manifold inlet and a second manifold inlet;

fuel nozzles fluidly connected to the fuel manifold and circumferentially distributed around the central axis, the fuel nozzles located downstream of the first manifold inlet and of the second manifold inlet relative to a flow of fuel from a fuel source to the fuel nozzles;

a flow divider valve upstream of the first manifold inlet and of the second manifold inlet of the fuel manifold and upstream of all of the fuel nozzles being fluidly connected to the fuel manifold;

a transfer tube assembly downstream of the flow divider valve and upstream of the one or more sections of the fuel manifold, the transfer tube assembly having a first tube slidably engaged to the fuel manifold and fluidly connected to the first manifold inlet, and a second tube slidably engaged to the fuel manifold and fluidly connected to the second manifold inlet; and an adaptor located downstream of the flow divider valve and upstream of both of the transfer tube assembly and the fuel manifold, the adaptor having:
- a body slidably engaged by the first tube and by the second tube,
- a first member defining a first fuel conduit fluidly connected to the first manifold inlet via the first tube, and
- a second member defining a second fuel conduit fluidly connected to the second manifold inlet via the second tube.

10. The aircraft engine of claim 9, wherein the first member is monolithically connected to the body.

11. The aircraft engine of claim 9, wherein the second member is a tube secured to the body.

12. The aircraft engine of claim 9, wherein the first member extends from the body to a first end, the first end defining a first flange securable to a flow divider valve.

13. The aircraft engine of claim 12, wherein the second member extends from the body to a second end, the second end defining a second flange securable to the flow divider valve.

14. The aircraft engine of claim 9, wherein the first member extends from the body to a first end and the second member extends from the body to a second end, the first end spaced apart and distinct form the second end.

15. The aircraft engine of claim 9, wherein the flow divider valve has an inlet, a primary outlet hydraulically connected to the first fuel conduit, and a secondary outlet hydraulically connected to the second fuel conduit.

16. The aircraft engine of claim 15, wherein the first member is a bracket secured to the flow divider valve, the transfer tube assembly supported by the bracket secured to the flow divider valve.

* * * * *